US008479163B2

(12) United States Patent
Kumar

(10) Patent No.: US 8,479,163 B2

(45) Date of Patent: Jul. 2, 2013

(54) SIMPLIFYING MAINTENANCE OF LARGE SOFTWARE SYSTEMS

(75) Inventor: Anuj Kumar, Lucknow (IN)

(73) Assignee: Oracle International Corporation, Redwood Shores, CA (US)

(*) Notice: Subject to any disclaimer, the term of this patent is extended or adjusted under 35 U.S.C. 154(b) by 909 days.

(21) Appl. No.: 12/613,523

(22) Filed: Nov. 5, 2009

(65) Prior Publication Data

US 2011/0107318 A1 May 5, 2011

(51) Int. Cl.
*G06F 9/44* (2006.01)

(52) U.S. Cl.
USPC .......................................... 717/124; 717/126

(58) Field of Classification Search
USPC .................................................. 717/124, 126
See application file for complete search history.

(56) References Cited

U.S. PATENT DOCUMENTS

| | | | | |
|---|---|---|---|---|
| 6,415,396 | B1 * | 7/2002 | Singh et al. | 714/38.13 |
| 6,802,054 | B2 | 10/2004 | Faraj | |
| 7,152,224 | B1 * | 12/2006 | Kaler et al. | 717/121 |
| 7,251,809 | B2 | 7/2007 | Barclay et al. | |
| 7,509,626 | B1 * | 3/2009 | Barnes et al. | 717/101 |
| 8,032,863 | B2 * | 10/2011 | Kolawa et al. | 717/124 |
| 2005/0091003 | A1 * | 4/2005 | Wu | 702/183 |
| 2006/0129992 | A1 * | 6/2006 | Oberholtzer et al. | 717/124 |
| 2006/0190930 | A1 | 8/2006 | Hecht et al. | |
| 2006/0265694 | A1 | 11/2006 | Chilimbi et al. | |
| 2010/0169874 | A1 * | 7/2010 | Izard et al. | 717/170 |

OTHER PUBLICATIONS

"Michael Fischer, Martin Pinzger, and Harald Gall", "Analyzing and Relating Bug Report Data for Feature Tracking", Proceedings of the 10th Working Conference on Reverse Engineering (WCRE'03), Publication Date: 2003, pp. 1-10.

"Trosky B. Callo Arias, Paris Avgeriou and Pierre America", "Analyzing the Actual Execution of a Large Software-Intensive System for Determining Dependencies", University of Groningen, Research Institute for Mathematics and Computing Science (IWI), Publication Date: 2008, pp. 1-10.

"Alexander Egyed", "A Scenario-Driven Approach to Trace Dependency Analysis", UCL Library Services, Publication Date: Feb. 2003, pp. 116-132.

"Orla Greevy and St'Ephane Ducasse", "Correlating Features and Code Using a Compact Two-Sided Trace Analysis Approach", Proceedings of CSMR 2005 (9th European Conference on Software Maintenance and Reengineering), Publication Date: 2005, pp. 1-11 (314-323).

(Continued)

*Primary Examiner* — Wei Zhen
*Assistant Examiner* — Lanny Ung
(74) *Attorney, Agent, or Firm* — Narendra Reddy Thappeta

(57) ABSTRACT

An aspect of the present invention simplifies maintenance of a software system by indicating the additional bug fixes that are to be tested when a bug is indicated to be fixed. In an embodiment, a user is required to indicate a list of software units and a first bug to indicate that the list of software units have been modified to fix the first bug. An analysis tool identifies a list of use cases, with each use case requiring execution of at least one of the list of software units. The analysis tool then determines a set of dependent bugs fixed earlier in the software system, where each of the set of dependent bugs affects at least one of the list of use cases. The set of dependent bugs are displayed as requiring further testing in view of fixing of the first bug.

20 Claims, 6 Drawing Sheets

OTHER PUBLICATIONS

"Tristan Denmat, Mireille Ducass'e and Olivier Ridoux", "Data Mining and Crosschecking of Execution Traces", ACM International Conference on Automated Software Engineering (ASE'05), Publication Date: 2005, pp. 1-4.

"David Loy, Siau-Cheng Khooy and Chao Liuz", "Mining Temporal Rules From Program Execution Traces", In proceedings of the 3rd International Workshop on Program Comprehension through Dynamic Analysis (PCODA'07), Publication Date: Oct. 29, 2007, pp. 1-5.

"M. Fischer, J. Oberleitner, Harald Gall and T. Gschwind", "System Evolution Tracking Through Exacution Trace Analysis", Publication Date: Mar. 8, 2005, pp. 1-11.

* cited by examiner 410, 420

```
<traceinfo>
  <usecase name = “login”>
    <methods>
      <method>ReceiveUserDetails</method>
      <method>ValidateUserDetails</method>
      <method>Authenticate</method>
    </methods>
  </usecase>
  <usecase name =”createuser”>
    <methods>
      <method>ReceiveUserDetails</method>
      <method>ValidateUserDetails</method>
      <method>CreateUserRecord</method>
    </methods>
  </usecase>
  <usecase name =”updateuser”>
    <methods>
      <method>ReceiveUserDetails</method>
      <method>ValidateUserDetails</method>
      <method>UpdateUserRecord</method>
    </methods>
  </usecase>
</traceinfo>
```

FIG. 4A 430, 440

```
<usecaseinfo>
  <usecase name = "login">
    <bugs>
      <bug id="1000" />
      <bug id="1500" />
    </bugs>
  </usecase>
  <usecase name ="createuser">
    <bugs>
      <bug id="1500" />
      <bug id="2000"/>
    </bugs>
  </usecase>
  ...
</usecaseinfo>
```

FIG. 4B 460, 470

```
<taskinfo>
  <bugs>
    <bug id= “1000” description="Not able to login with different locale>
    <methods>
  <method>ReceiveUserDetails</method>
    </methods>
   </bug>
   <bug id= “1500” description="User name is case-sensitive" />
    <methods>
      <method> ReceiveUserDetails </method>
      <method>ValidateUserDetails</method>
    </methods>
  </bug>
    <bug id= “2000” description="User data not created>
    <methods>
      <method>CreateUserRecord</method>
    </methods>
    </bug>
  </bugs>
</taskinfo>
```

FIG. 4C

SIMPLIFYING MAINTENANCE OF LARGE SOFTWARE SYSTEMS

BACKGROUND OF THE INVENTION

1. Field of the Invention

The present disclosure relates to software systems, and more specifically to a method and apparatus for simplifying maintenance of large software systems.

2. Related Art

A software system refers to a collection of modules, which when executed provide one or more closely coupled user applications. As is well known in the relevant arts, a module refers to a portion of a user application, which is independently stored/compiled, etc., before being linked with other modules to form machine executable instructions of the software system. The software system (user applications) executes in a run-time environment (operating system, etc.), which can be shared by several software systems, as is also well known in the relevant arts.

There is an increasing need to provide large software systems due to reasons such as enhanced complexity of software applications, etc. Larger software systems contain more instructions (at machine executable level or higher levels) than smaller software systems for the same run-time environment. The instructions are partitioned into several modules, as noted above.

Maintenance of a software system generally entails making changes to different modules (or deletion/addition of some modules), typically for addressing identified problems during development of the software system and/or identified by a user of the software system post implementation, providing new (typically incremental) features or for performance reasons, and/or addressing other quality assurance (QA) issues. The complexity of maintenance of software systems is generally more for larger software systems.

Various aspects of the present invention simplify maintenance of software systems, as described below with examples.

BRIEF DESCRIPTION OF THE DRAWINGS

Example embodiments of the present invention will be described with reference to the accompanying drawings briefly described below.

FIG. 4A depicts data indicating the software units requiring execution for operation of corresponding use cases of software application, in an embodiment.

FIG. 4B depicts data indicating the specific use cases affected by fixing of corresponding bugs in an embodiment.

FIG. 4C depicts the corresponding software units modified while fixing each bug, in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF THE EXAMPLE EMBODIMENTS

1. Overview

An aspect of the present invention simplifies maintenance of a software system by indicating the additional bug fixes that are to be tested when a bug is indicated to be fixed. A testing professional may accordingly ensure the indicated additional bug fixes are also adequately tested.

In an embodiment, a user is required to indicate a list of software units and a bug to indicate that the list of software units have been modified to fix the bug. An analysis tool identifies a list of use cases, with each use case requiring execution of at least one of the list of software units. The analysis tool then determines a set of dependent bugs fixed earlier in the software system, where each of the set of dependent bugs affects at least one of the list of use cases. The set of dependent bugs are displayed as requiring further testing in view of fixing of the bug.

According to another aspect of the present invention, the analysis tool determines a critical bug, the fixing of which had earlier required modification of a same software unit as that modified by the bug. A testing professional can accordingly retest the features associates with the critical bugs, with additional caution.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
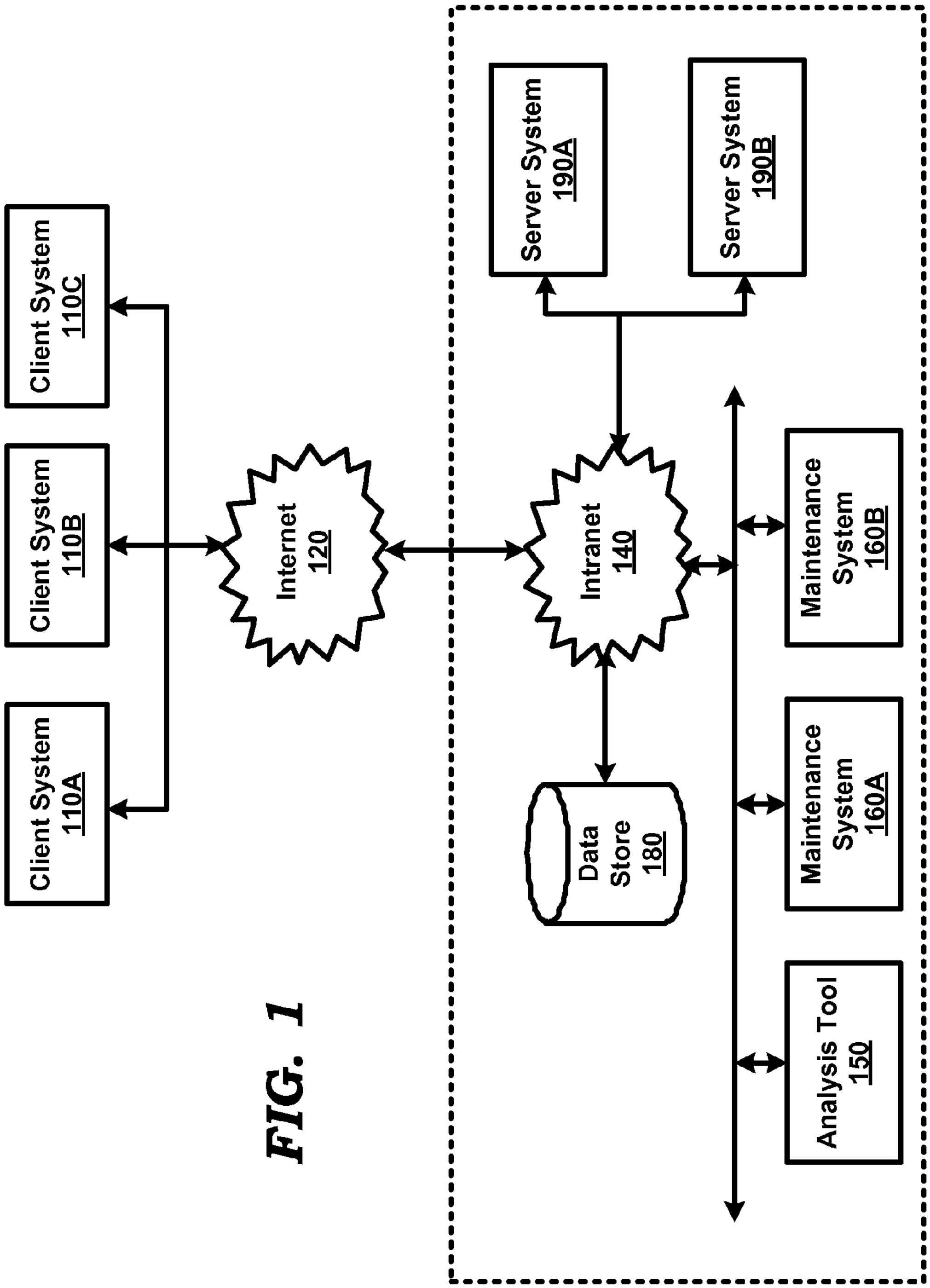
FIG. 1 is a block diagram illustrating an example environment in which several aspects of the present invention can be implemented.

FIG. 1 is a block diagram illustrating an example environment (computing system) in which several aspects of the present invention can be implemented. The block diagram is shown containing client systems 110A-110C, internet 120, intranet 140, analysis tool 150, maintenance systems 160A-160B, data store 180 and server systems 190A-190B.

Merely for illustration, only representative number/type of server systems, maintenance systems and data store is shown in FIG. 1. Many environments often contain many more systems and data stores, both in number and type, and located geographically separately (but connected with each other via corresponding communication paths), depending on the purpose for which the environment is designed. Each system/device of FIG. 1 is described below in further detail.

Intranet 140 represents a network providing connectivity between server systems 190A-190B, maintenance systems 160A-160B, data store 180 and analysis tool 150 (all shown within an enterprise, as indicated by the dotted boundary). Internet 120 extends the connectivity of any of these (in general, any of the systems within the enterprise) with client systems 110A-110C. Any of Internet 120 and Intranet 140 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Data store 180 represents a non-volatile storage facilitating storage and retrieval of a collection of data by one or more (enterprise) software applications executing in server systems 190A-190B (typically while processing various client/user requests). Some of the data stores may be implemented using relational database technologies and therefore provide storage and retrieval of data using structured queries such as SQL (Structured Query Language). Other data stores may be implemented as file stores providing storage and retrieval of data in the form of one or more files organized as one or more directories, as is well known in the relevant arts. In either case, data store 180 (or many of such stores together) is assumed to store the modules forming a software system, which is maintained according to various aspects of the present invention.

Each of client systems 110A-110C represents a system such as a personal computer, workstation, mobile station, etc., used by users to generate (client) requests, which cause server systems 190A-190B to generate corresponding responses. The requests may be generated (and responses displayed) using appropriate user interfaces displayed on display units associated with client systems 110A-110C. In general, a client system requests a user application in server systems 190A-190B for performing desired tasks/services and receives corresponding responses containing the results of performance of the requested tasks/services. A request sent by a user to enable performing a desired task and a corresponding response together (i.e., one interaction) represents a single use case.

Each of server systems 190A-190B represents a server, such as a web/application server, some of which together execute enterprise applications (software systems) capable of performing tasks requested by requests/users using one of client systems 110A-110C. The enterprise applications may perform the tasks on data maintained internally or on external data (for example, stored in data store 180) and then send the result of performance of the tasks to the requesting client system as a corresponding response. Each of server systems 190A-190B may also execute other software programs such as operating system (for example, UNIX), device drivers (each usually corresponding to a hardware component), that provide a (common) run time environment facilitating the execution of the enterprise applications.

Each of maintenance systems 160A-160B represents a hardware system providing the necessary development/maintenance environment for the software systems. A developer (member of a maintenance team) may thus use a maintenance system to test the software modules and perform activities associated with maintenance tasks, which includes modifying specific modules of the software application and testing of the modifications.

Analysis tool 150 represents a system which implements several aspects of the present invention to simplifying maintenance of a software system. Even though shown separately, various features of analysis tool 150 (potentially in its entirety) may be provided by any of maintenance systems 160A-160B.

One common problem in maintenance of software systems is that there is often dependency of modules, implying a change to one module (base module) may affect operation of other modules (dependent module). It may accordingly be necessary to ensure that dependent modules also operate as desired, upon making of changes to base module. The manner in which at least such a requirement may be addressed, is described below with examples.

3. Simplifying Maintenance of a Software System

Figure 2:
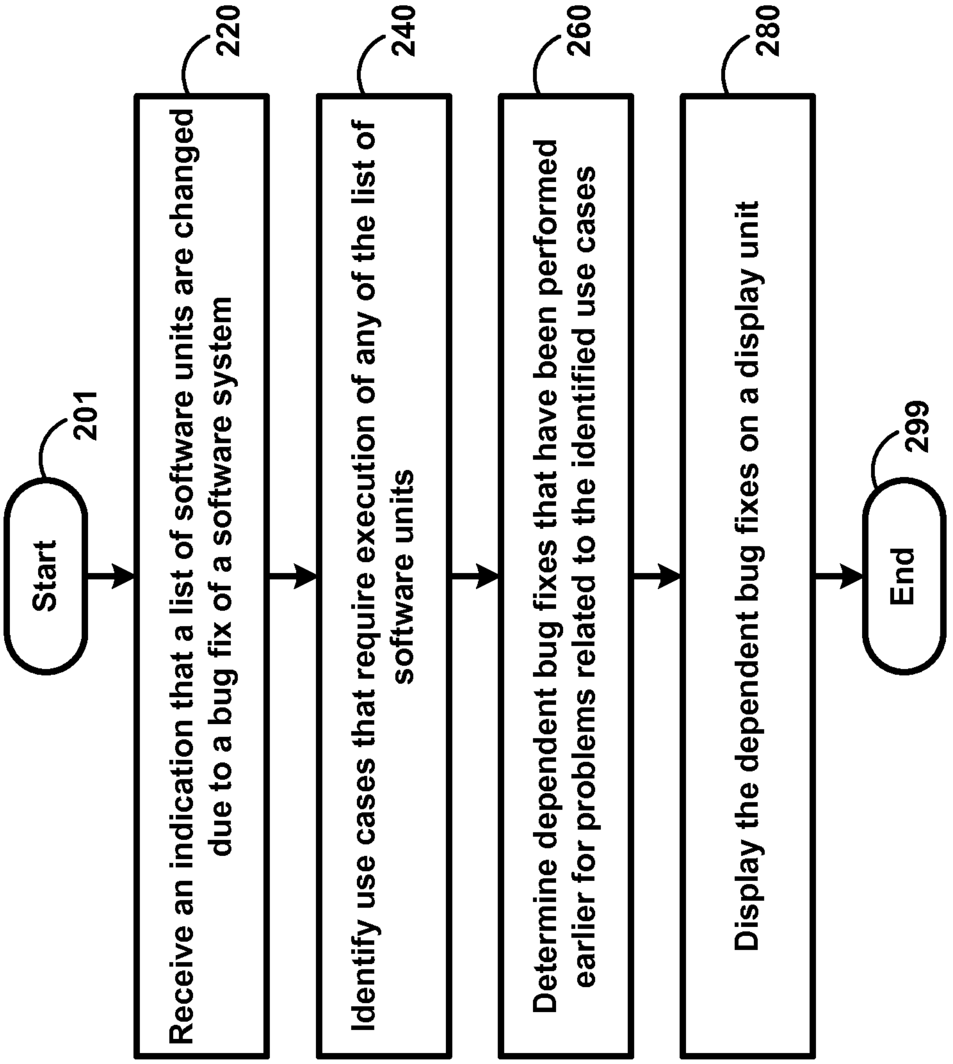
FIG. 2 is a flowchart illustrating the manner in which maintenance of a software system is simplified according to an aspect of the present invention.

FIG. 2 is a flow chart illustrating the manner in which maintenance of a software system is simplified according to an aspect of the present invention. The flowchart is described with respect to FIG. 1, and in relation to analysis tool 150 merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, analysis tool 150 receives an indication that a list of software units are changed due to a bug fix of a software system. In general, a software unit contains a logical group of successive instructions (identified, for example, as method, procedure, function, or module, etc.), typically grouped for convenience in program development and maintenance. The list may be received from a developer (on intranet 140 or using a keyboard/pointer device provided within analysis tool 150) providing a solution to fix an error associated with a maintenance task. The developer may provide such a list based on personal knowledge of the maintenance activities.

In step 240, analysis tool 150 identifies use cases that require execution of any of the list of software units. Thus, for a request of a given use case, if a software unit (in the list of step 220) can be executed, that given use case may be included in the identified set of use cases. Accordingly, in an embodiment, a trace feature is used to identify the software units executed for each of the use cases, and the identified information is maintained for examination in step 240. However, alternative techniques such as those based on inspecting the software code of the software system, may also be employed for the same information.

In step 260, analysis tool 150 determines dependent bug fixes that have been performed earlier for problems related to the identified use cases. Thus, for requests associated with any of the identified use cases, a bug has been reported/fixed, that bug fix may be determined to be a dependent bug fix. In an embodiment, analysis tool 150 determines dependent bug fixes and associated priority based on data received and maintained by analysis tool 150 indicating bug fixes that have been performed in a software system associated with various use cases.

In step 280, analysis tool 150 displays the dependent bug fixes on a display unit provided with maintenance systems 160A/-160B. By displaying the dependent bug fixes, the specific manner in which the changes to the indicated list of software units affect other portions of the software system can be easily determined (e.g., by retesting the features purported to be fixed by the dependent bugs), thus simplifying maintenance of software systems.

The description is continued with an illustration of the manner in which analysis tool 150 may receive data corresponding to a bug fix and may identify dependent use cases and display dependent bug fixes in an embodiment.

4. Displaying Dependent Use Cases and Dependent Bugs

Figure 3:
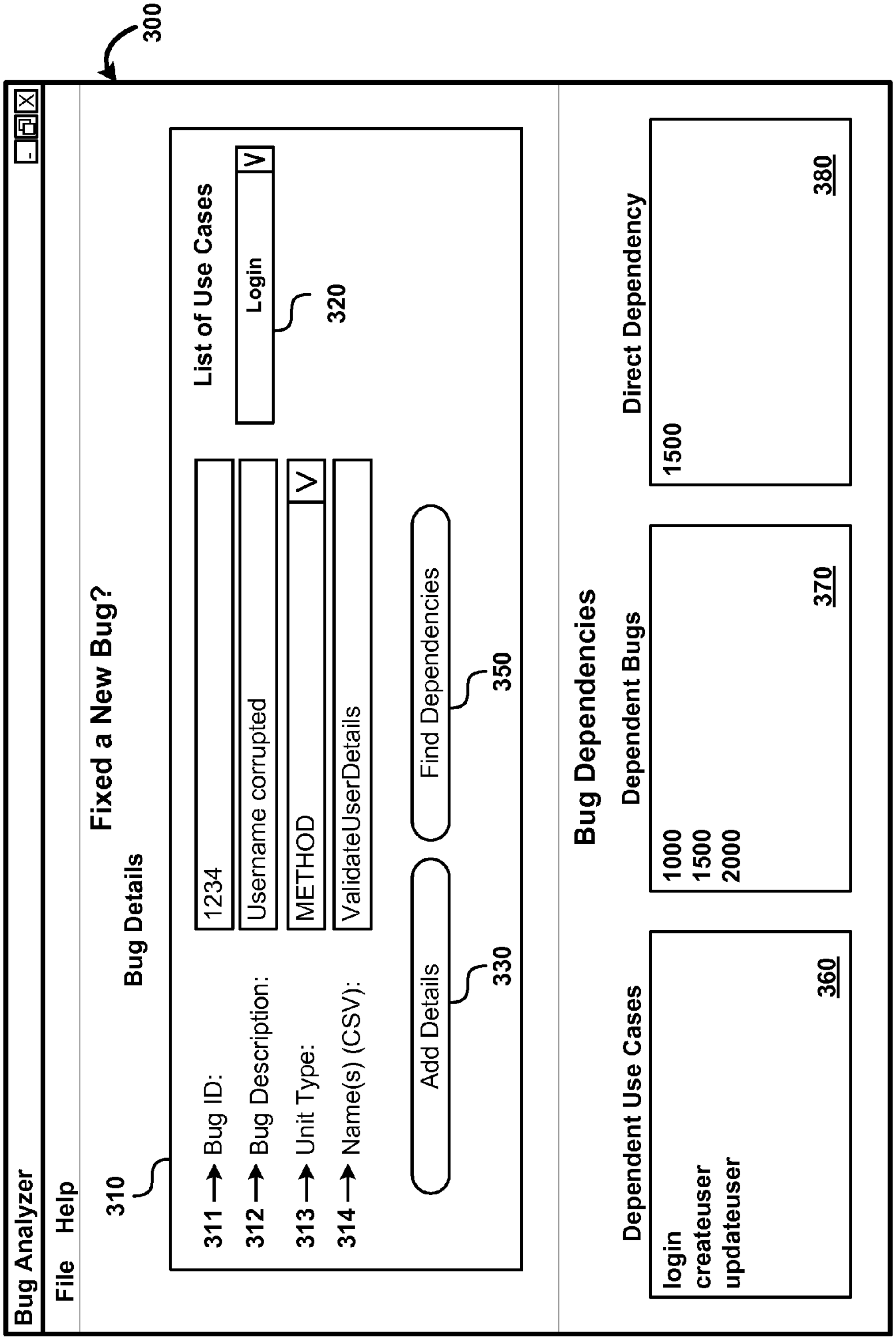
FIG. 3 depicts the display on a display unit illustrating the user interface in an embodiment.

FIG. 3 depicts a user interface using which the developer is enabled to indicate data representing details of a bug fix. Accordingly, the user interface is shown containing various controls. However, in alternative embodiments, the values may be received in the form of data files in a format specified by the analysis tool, for example XML format.

Broadly, analysis tool 150 executes corresponding instructions to display a user interface of FIG. 3, on a display unit provided with maintenance system 160A/160B. An operator operating on maintenance system 160A/160B may indicate values associated with a bug fix from a input device (mouse, keyboard etc.) associated with maintenance system 160A/160B and further may select a suitable control from the user interface for the indicated values to be received by the analysis tool 150 (for example, via intranet 140).

On receiving the indicated values, analysis tool 150 may execute corresponding instructions to identify the use cases and to determine dependent bug fixes with the associated priority. The logic (as in the flowchart of FIG. 2) underlying such identification/determination may be hard-coded within instructions. Alternatively, such logic may be embodied in the form of rules provided by an administrator. Analysis tool 150 may accordingly be designed to include a "Rule Engine" (not shown) which processes the inputs of FIG. 3 (step 220) in order to identify the dependent use cases and determine dependent bug fixes.

With reference to FIG. 3, display 300 represents a user interface shown containing input portion 310 and display portions 360, 370 and 380. The user provides various input information/values on a bug that has been fixed, and receives as display output the information in display portions 360, 370 and 380 as described below.

Input portion 310 is shown containing text controls to enable the developer to indicate corresponding input values for "Bug Id" (311), "bug description" (312), "unit type" (313) and "names" (314), "list of use cases" (320) associated with a bug fix, and controls labeled "Add Details" (330) and "Find Dependencies" (350).

Values in text controls "bug Id" (311) and "bug description" (312) respectively represent a unique identifier associated with a bug fix and a brief description of the bug which may be indicated by an operator. It is assumed that the developer has indicated a value of "1234" for the bug identifier and "Username Corrupted" for the bug description. Unit type 313 indicates that "method" is the software unit, indicated to be changed. The field can take on other values such as function, module, procedure, etc.

Text control "Name(s) (CSV)" enables the operator to indicate values corresponding to the names of the modules affected (modified) due to fixing of the bug. The user may indicate names of multiple modules by separating the values with a comma as shown in portion 314. The developer has indicated that a method with name "ValidateUserDetails" have been modified to fix the 'Username Corrupted' problem.

Portion 320 enables the operator to indicate names of use case associated with the bug fix indicating the specific request/response that resulted in the occurrence of the bug. The operator has indicated a value as "login". Alternatively, the operator may select value(s) of a use case(s) from a list of use cases from portion 320. As may be readily appreciated, each user interaction (use case) may be given a specific label, and the list of such user interactions forms the set of use cases, which are maintained/stored as a list within analysis tool 150.

Control 350 labeled "Find Dependencies", when actuated (e.g., clicked on), causes analysis tool 150 to identify dependent use cases (displayed in portion 360) and determine dependent bug fixes (displayed in portion 370). Portion 380 is shown identified as a 'direct dependency', implying this to be a critical bug that needs to be more carefully retested (as described with respect to the data of FIGS. 4A-4C and 5A-5B below).

The operator may select/actuate control "Add Details" (330) to cause some of the data maintained to be updated, as also described below with respect to FIGS. 4A-4C and 5A-5B.

5. Example Data

FIGS. 4A-4C depicts the information maintained by analysis tool 150 in an embodiment. Though the content is shown encoded in extensible markup language (XML) for illustration, other encoding/formats may be used for representing the same information.

FIG. 4A depicts data (in portion 410) indicating the specific methods (software units) that are executed for each corresponding use case. As noted above, the information may be gathered by tracing execution of the software instructions, when each use case is operative and thus the data may be referred to as trace data.

Lines in portion 420 (between tags "<usecase>" and "</usecase>") specify that for the use case with name "login", the identifiers of the methods executed are "ReceiveUserDetails", "ValidateUserDetails" and "Authenticate". Methods associated with other use cases with corresponding names "createuser" and "updateuser" are similarly explained.

FIG. 4B represents a text file containing a portion (430) of data indicating the specific use cases affected by each of the bugs (assumed to have a one to one correspondence with a bug and thus used synonymously in several instances) fixed earlier (i.e., before the actuation of various controls of FIG. 3). A bug affects a use case if fixing of the bug requires changes to instructions executed during the operation (request/response or processing in between) of the use case.

Lines in portion 430 (between tags "<usecaseinfo>" and "</usecaseinfo>") depict the list of bug fixes that have been performed earlier associated with each corresponding use case. Lines in portion 440 (between tags "<usecase>" and "</usecase>") specify that for the use case with name "login", the bug fixes that were performed earlier include those with identifiers "1000" and "1500" enclosed between tags <bugs> and </bugs>. Bugs reported for the use case (or use cases affected by the bug fixes) with corresponding name "createuser" may be similarly explained. Bug fixes for other use cases (e.g., updateuser) may similarly be specified (though not shown).

FIG. 4C represents a file containing portion (460) of data indicating the methods that have been modified for each bug fix. Lines in portion 460 (between tags "<taskinfo>" and "</taskinfo>") depict the list of methods that have been modified for each corresponding bug fix enclosed within tags "<bugs>" and "</bugs>".

Lines in portion 470 (between tags "<bug>" and "</bug>") specify that for the bug with identifier "1500", and description "User name is case-sensitive" the methods with names "ReceiveUserDetails" and "ValidateUserDetails" have been modified. Methods that were modified for other bug fixes may be similarly explained.

It is assumed that the data of FIGS. 4A-4C is present when the user provides inputs in area 310 of FIG. 3 and actuates the "Find Dependencies" 350. The operation thereafter, based on the data of FIGS. 4A-4C is described below.

6. Example Operation

The operation of analysis tool 150 upon receiving the user entered data indicated in portion 310, is described now. In an embodiment, analysis tool 150 compares the value in each row within tags <method>, </method> of FIG. 4A with the indicated values of method names (in 314) to identify the list of use cases requiring execution of the indicated method names. In the present example, the value enclosed within the tags <method> and </method> are compared with the method names "ValidateUserDetails" (value in field 314) and thus the list of use cases (of step 240) is determined to be "createuser" and "updateuser".

According to the present embodiment, portion 360 displays the list of identified dependent use cases. Thus, portion 360 is shown displaying a list of dependent use cases as "login", "createuser" and "updateuser" (determined from trace data).

Analysis tool 150 examines text file of FIG. 4B in order to determine the bug fixes (dependent bug fixes) which affect any of the dependent use cases identified based on step 240. Thus, for the example scenario, bugs "1000" and "1500" are the list of bug fixes affecting use case "login" and bugs "1500 and "2000" are the bug fixes affecting the use case "createuser". The list of dependent bugs contains bugs having identifiers "1000", "1500" and "2000" as displayed in portion 370.

According to an aspect of the present invention, analysis tool 150 identifies critical bugs, which require particular retesting in view of the bug indicated to have been fixed in area 310. A bug is deemed to be critical, if the methods indicated to be modified in area 314 are also affected by the corresponding fix. Such information is gleaned by examining FIG. 4C. As may be readily observed from FIG. 4C, bug "1500" required modifications to the module "ValidateUserDetails", which has also been indicated (in 314) as having been modified for the bug "1234". Accordingly, bug "1500" is determined to be a critical bug and displayed in portion 380.

Thus, by displaying dependent use cases (in portion 360), dependent bugs (in portion 370) and the critical bugs (in portion 380), a testing professional may pay particular attention to testing the critical bugs, while also adequately testing (less critical testing compared to critical bugs) the remaining depending bugs.

Analysis tool 150 may be used to further update some of the information as the bug fix information is provided using portion 310. On selecting control "Add Details" 330, analysis tool 150 updates text files of FIGS. 4B and 4C based on the indicated values in portion 310 as described below with respect to FIGS. 5A and 5B.

7. Example Data Maintenance

Figure 5A:
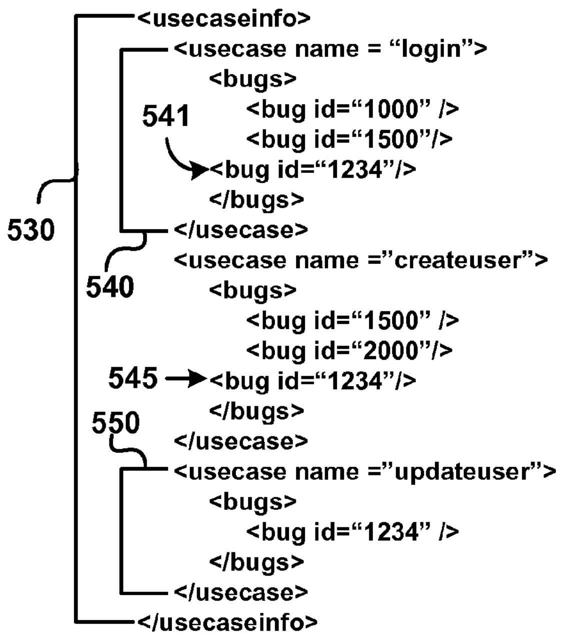
FIG. 5A depicts updates to the data of FIG. 4B in response to user indicating that a bug has been fixed.
Figure 5B:
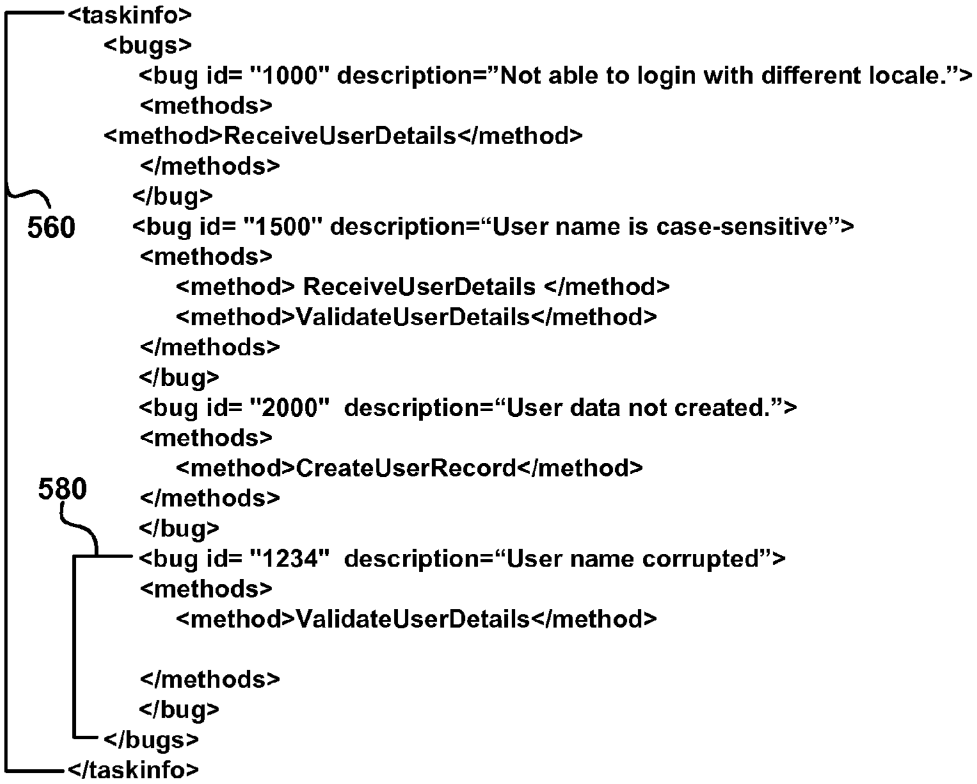
FIG. 5B depicts updates to the data of FIG. 4C in response to user indicating that a bug has been fixed.

FIGS. 5A and 5B depict the updated information of corresponding text files of FIGS. 4B and 4C (after the interaction described with respect to FIG. 3) respectively, in one embodiment. With reference to FIG. 5A, portion 530 represents a corresponding portion 430 updated with the details of the indicated bug fix of FIG. 3.

Portion 530 is shown containing additional data as represented by lines 541, 545 and portion 550. Line 541 is shown added indicating that the use case "login" is affected by bug (having a description "User name corrupted") with identifier "1234".

Line 545 and portion 550 are shown added based on the identified dependent use cases (of step 240) for the present example scenario ("login", "createuser" and "updateuser"). Accordingly, line 545 is included for the use case "login" between the tags "<usecase name="createuser">" and "</usecase>", indicating that use case "createuser" is affected by an additional bug "1234".

Portion 550 represents data portion added to the text file of FIG. 4B indicating that the use case "updateuser" if affected by bug "1234". It may be appreciated that portion 550 is represented according to the convention of FIG. 4B. Thus the tag <use case> has the value for name as "updateuser" and the affecting bug fixes are enclosed within the tags "<bugs>" and "</bugs>".

With reference to FIG. 5B, portion 580 represents the updated portion of text data in comparison to the content of FIG. 4C. Accordingly, portion 580 contains data corresponding to bug "1234" indicated in FIG. 3. Values indicated in text controls 311 and 312 are shown used between tags <bug id="1234"> and </bug>. Method "ValidateUserDetails" is indicated to be modified by bug "1234" in portion 314.

It should be appreciated that the information thus updated can be used for determining the dependent use cases and dependent bugs, to simplify the maintenance of software systems.

It should be appreciated that the features described above can be implemented in various embodiments as a desired combination of one or more of hardware, executable modules and firmware. The description is continued with respect to an embodiment in which various features are operative when software instructions are executed.

8. Digital Processing System

Figure 6:
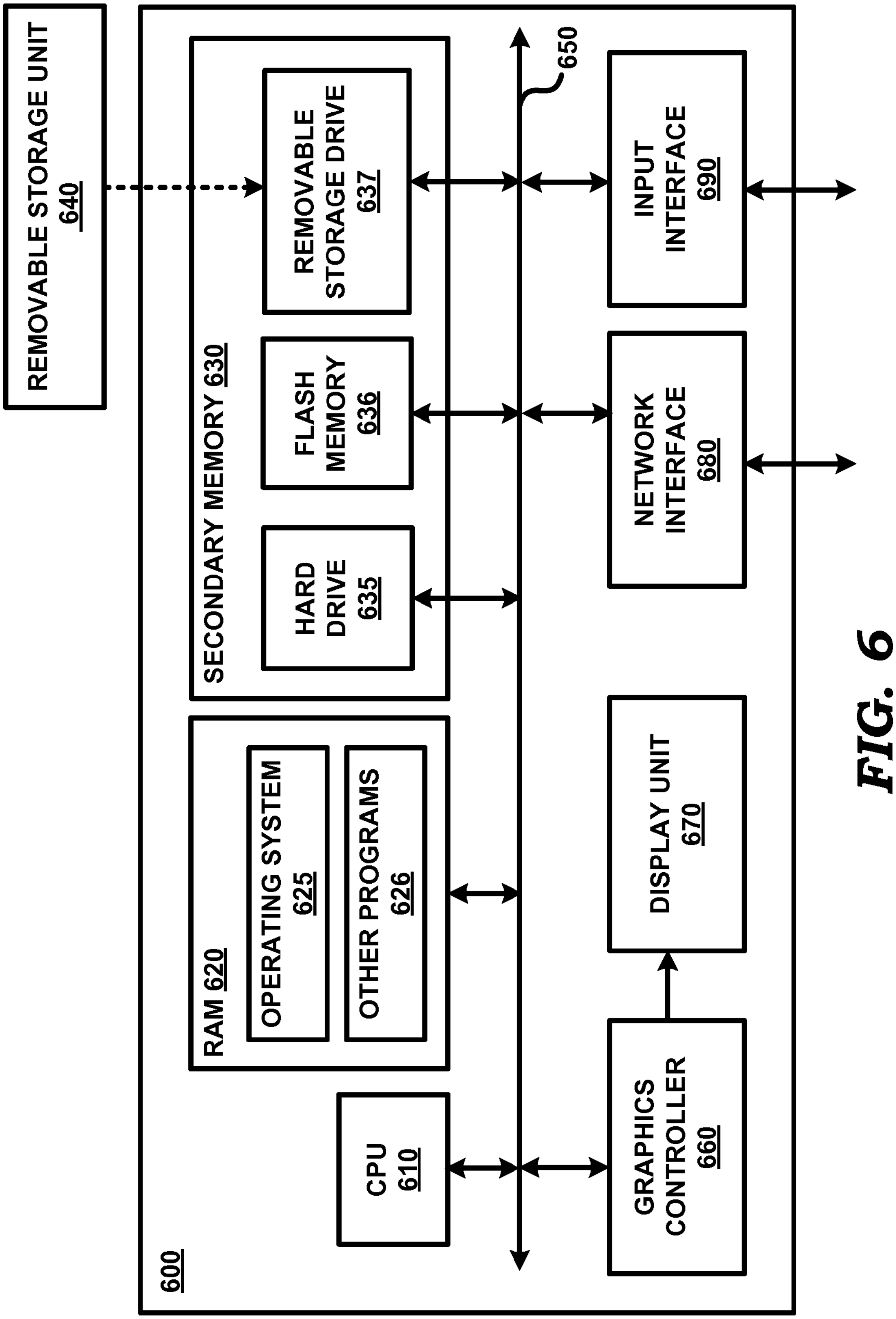
FIG. 6 is a block diagram illustrating the details of digital processing system in which various aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to analysis tool 150 or maintenance system 160A/160B. Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general purpose processing unit. RAM 620 may receive instructions from secondary memory 630 using communication path 650. RAM 620 may also store data (e.g., that of FIGS. 4A-4C and 5A-5B) used by instructions executed using CPU 610.

Graphics controller 660 generates display signals (e.g., in RGB format) to display unit 670 based on data/instructions received from CPU 610. Display unit 670 contains a display screen to display the images (e.g., that in FIG. 3) defined by the display signals. Input interface 690 may correspond to a keyboard and a pointing device (e.g., touch-pad, mouse). Network interface 680 provides connectivity to a network (e.g., using Internet Protocol), and may be used to communicate with other connected systems of FIG. 1.

Secondary memory 630 may contain hard drive 635, flash memory 636 and removable storage drive 637. Secondary memory 630 may store the data (e.g., that corresponding to FIGS. 4A-4C and 5A-5B) and software instructions (e.g., implementing the flowchart of FIG. 2), which enable digital processing system 600 to provide several features in accordance with the present invention. Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer readable storage medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Also, the various aspects, features, components and/or embodiments of the present invention described above may be embodied singly or in any combination in a data storage system such as a database system.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of simplifying maintenance of a software system organized as a plurality of software units, said software system operable to provide a plurality of use cases to users of said software system, said method comprising:

receiving a list of software units and a first bug, to indicate that said list of software units have been modified to fix said first bug;

identifying a list of use cases, with each use case requiring execution of at least one of said list of software units, said list of use cases being contained in said plurality of use cases;

determining, at a time instant, a set of dependent bugs of a plurality of bugs, wherein said plurality of bugs are fixed earlier than said time instant in said software system, wherein a bug of said plurality of bugs is included in said set of dependent bugs only if said bug affects at least one of said list of use cases, wherein said set of dependent bugs is a subset of said plurality of bugs such that the number of bugs in said set of dependent bugs is less than the number of bugs in said plurality of dependent bugs; and displaying said set of dependent bugs as requiring further testing in view of fixing of said first bug.

2. The method of claim 1, wherein said determining determines a critical bug contained in said set of dependent bugs, wherein fixing of said critical bug requires modifying a same software unit as fixing said first bug.

3. The method of claim 2, further comprising:

maintaining a first data portion indicating a corresponding set of software units executed for each of said plurality of use cases, wherein said identifying examines said first data portion for matching use cases corresponding to each of said list of software units to identify said list of use cases.

4. The method of claim 3, wherein said maintaining comprises tracing execution flow when each of said plurality of use cases is operative, to determine the set of software units executed for each use case.

5. The method of claim 3, further comprising:

maintaining a second data portion indicating a corresponding set of bugs affecting each use case, wherein said determining examines said second data portion for matching bugs for each of said list of use cases to determine said set of dependent bugs.

6. The method of claim 5, further comprising:

maintaining a third data portion indicating a corresponding set of software units modified for fixing each bug, wherein said critical bug is determined based on said third data portion.

7. The method of claim 6, further comprising:

updating said second data portion and said third data portion in response to said receiving, wherein said second data portion is updated to indicate that said first bug affects each of said list of use cases, wherein said third data portion is updated to indicate that each of said list of software units is modified due to fixing of said first bug.

8. The method of claim 7, wherein said software unit comprises one of a software method, a software procedure, or a module.

9. A non-transitory machine readable medium storing one or more sequences of instructions for causing a system to facilitate simplifying maintenance of a software system organized as a plurality of software units, said software system operable to provide a plurality of use cases to users of said software system, wherein execution of said one or more sequences of instructions by one or more processors contained in said system causes said system to perform the actions of:

receiving a list of software units and a first bug, to indicate that said list of software units have been modified to fix said first bug;

identifying a list of use cases, with each use case requiring execution of at least one of said list of software units, said list of use cases being contained in said plurality of use cases;

determining, at a time instant, a set of dependent bugs of a plurality of bugs, wherein said plurality of bugs are fixed earlier than said time instant in said software system, wherein a bug of said plurality of bugs is included in said set of dependent bugs only if said bug affects at least one of said list of use cases, wherein said set of dependent bugs is a subset of said plurality of bugs such that the number of bugs in said set of dependent bugs is less than the number of bugs in said plurality of dependent bugs; and displaying said set of dependent bugs as requiring further testing in view of fixing of said first bug.

10. The non-transitory machine readable medium of claim 9, wherein said determining determines a critical bug contained in said set of dependent bugs, wherein fixing of said critical bug requires modifying a same software unit as fixing said first bug.

11. The non-transitory machine readable medium of claim 10, further comprising:

maintaining a first data portion indicating a corresponding set of software units executed for each of said plurality of use cases, wherein said identifying examines said first data for matching use cases corresponding to each of said list of software units to identify said list of use cases.

12. The non-transitory machine readable medium of claim 11, wherein said maintaining comprises tracing execution flow when each of said plurality of use cases is operative, to determine the set of software units executed for each use case.

13. The non-transitory machine readable medium of claim 11, further comprising:

maintaining a second data portion indicating a corresponding set of bugs affecting each use case, wherein said determining examines said second data portion for matching bugs for each of said list of use cases to determine said set of dependent bugs.

14. The non-transitory machine readable medium of claim 13, further comprising:

maintaining a third data portion indicating a corresponding set of software units modified for fixing each bug, wherein said critical bug is determined based on said third data portion.

15. The non-transitory machine readable medium of claim 14, further comprising:

updating said second data portion and said third data portion in response to said receiving, wherein said second data portion is updated to indicate that said first bug affects each of said list of use cases, wherein said third data portion is updated to indicate that each of said list of software units is modified due to fixing of said first bug.

16. A computing system comprising:

a plurality of server systems executing a software system organized as a plurality of software units, said software system operable to provide a plurality of use cases to users of said software system;

a client system operable by a user to invoke any of said plurality of use cases in said software system; and a maintenance system comprising at least one processor and a memory, wherein said at least one processor retrieves instructions from said memory and executes the retrieved instructions, wherein execution of the retrieved instructions causes said maintenance system to perform the actions of:

receiving a list of software units and a first bug, to indicate that said list of software units have been modified to fix said first bug, said list of software units being contained in said plurality of software units;

identifying a list of use cases, with each use case requiring execution of at least one of said list of software units, said list of use cases being contained in said plurality of use cases;

determining, at a time instant, a set of dependent bugs of a plurality of bugs, wherein said plurality of bugs are fixed earlier than said time instant in said software system, wherein a bug of said plurality of bugs is included in said set of dependent bugs only if said bug affects at least one of said list of use cases, wherein said set of dependent bugs is a subset of said plurality of bugs such that the number of bugs in said set of dependent bugs is less than the number of bugs in said plurality of dependent bugs; and displaying said set of dependent bugs as requiring further testing in view of fixing of said first bug.

17. The computing system of claim 16, wherein to perform said determining, said maintenance system further performs the action of determining a critical bug contained in said set of dependent bugs, wherein fixing of said critical bug requires modifying a same software unit as fixing said first bug.

18. The computing system of claim 17, wherein to perform said identifying action, said maintenance system is further operable to:

maintain a first data portion indicating a corresponding set of software units executed for each of said plurality of use cases, and examine said first data portion for matching use cases corresponding to each of said list of software units to identify said list of use cases.

19. The computing system of claim 18, wherein said maintain comprises tracing execution flow when each of said plurality of use cases is operative, to determine the set of software units executed for each use case.

20. The computing system of claim 18, wherein to perform said determining, said maintenance system is further operable to:

maintain a second data portion indicating a corresponding set of bugs affecting each use case, and examine said second data portion for matching bugs for each of said list of use cases to determine said set of dependent bugs.

* * * * *

UNITED STATES PATENT AND TRADEMARK OFFICE

CERTIFICATE OF CORRECTION

PATENT NO. : 8,479,163 B2
APPLICATION NO. : 12/613523
DATED : July 2, 2013
INVENTOR(S) : Kumar It is certified that error appears in the above-identified patent and that said Letters Patent is hereby corrected as shown below:

On Title page 2, column 2, item (56), under Other Publication, line 5, delete “Exacution” and insert -- Execution --, therefor.

Signed and Sealed this
Twenty-second Day of October, 2013

Teresa Stanek Rea
*Deputy Director of the United States Patent and Trademark Office*